(12) United States Patent
Peters et al.

(10) Patent No.: US 12,706,469 B2
(45) Date of Patent: Aug. 11, 2026

(54) WIRELESS CHARGER ASSEMBLY FOR A CELLPHONE

(71) Applicant: ANNEX PRODUCTS PTY. LTD., South Yarra (AU)

(72) Inventors: Christopher L. Peters, South Yarra (AU); Marco Sebastiani, South Yarra (AU)

(73) Assignee: Annex Products Pty. Ltd., South Yarra (AU)

( * ) Notice: Subject to any disclaimer, the term of this patent is extended or adjusted under 35 U.S.C. 154(b) by 571 days.

(21) Appl. No.: 17/859,528

(22) Filed: Jul. 7, 2022

(65) Prior Publication Data

US 2023/0208165 A1 Jun. 29, 2023

Related U.S. Application Data

(60) Provisional application No. 63/290,799, filed on Dec. 17, 2021.

(51) Int. Cl.
*H02J 7/00* (2006.01)
*H02J 7/70* (2026.01)
*H02J 50/10* (2016.01)

(52) U.S. Cl.
CPC .............. *H02J 7/731* (2026.01); *H02J 50/10* (2016.02)

(58) Field of Classification Search
CPC ................................ H02J 7/0044; H02J 50/10
USPC .................................................. 320/107, 108
See application file for complete search history.

(56) References Cited

U.S. PATENT DOCUMENTS

| | | | |
|---|---|---|---|
| 2,797,655 | A | 7/1957 | Morehouse |
| 3,013,688 | A | 12/1961 | Luning |
| 3,041,697 | A | 7/1962 | Budreck |
| 3,521,216 | A | 7/1970 | Tolegian |
| 3,642,122 | A | 2/1972 | Von Ende |
| 3,741,376 | A | 6/1973 | Brown et al. |
| 3,808,577 | A | 4/1974 | Mathhauser |
| 4,319,097 | A | 3/1982 | Liautaud |
| 4,480,361 | A | 11/1984 | Morita |

(Continued)

FOREIGN PATENT DOCUMENTS

| | | |
|---|---|---|
| CN | 2678269 Y | 2/2005 |
| CN | 102096451 | 6/2011 |

(Continued)

OTHER PUBLICATIONS

Garmin, "Garmin Forerunner 310 XT: quick release instructions" pp. 1-60, May 2009.

(Continued)

*Primary Examiner* — Richard V Muralidar
(74) *Attorney, Agent, or Firm* — Sterne, Kessler, Goldstein & Fox P.L.L.C.

(57) ABSTRACT

A wireless charger assembly for wirelessly charging a cellphone having a receiving coil. The assembly includes a cellphone case securable to the cellphone having a bottom defining a bore. The bottom has a thickness surrounding the bore. The assembly also includes a wireless charger mount securable to the cellphone case, including a base, a protrusion, and a transmitting coil housed within the protrusion. The protrusion and the transmitting coil are receivable within the bore for charging the cellphone when the cellphone case is secured to the cellphone and the wireless charger mount.

18 Claims, 6 Drawing Sheets

(56) References Cited

U.S. PATENT DOCUMENTS 4,982,581 A 1/1991 Furuyama
4,991,270 A 2/1991 Aoki
5,025,966 A 6/1991 Potter
5,367,891 A 11/1994 Furuyama
5,377,392 A 1/1995 Morita
5,550,452 A 8/1996 Shirai et al.
5,572,887 A 11/1996 Geswelli
5,577,696 A 11/1996 Kramer
5,708,874 A 1/1998 Schrock et al.
5,920,966 A 7/1999 Chen
5,933,926 A 8/1999 Reiter
5,983,464 A 11/1999 Bauer
5,992,807 A 11/1999 Tarulli
6,009,601 A 1/2000 Kaufman
6,131,247 A 10/2000 Morita
6,135,408 A 10/2000 Richter
6,149,116 A 11/2000 Wor
6,170,131 B1 1/2001 Shin
6,215,381 B1 4/2001 Aoki
6,295,702 B1 10/2001 Bauer
6,305,656 B1 10/2001 Wemyss
6,434,801 B2 8/2002 Grunberger
6,502,727 B1 1/2003 Decoteau
6,564,434 B1 5/2003 Morita
6,640,398 B2 11/2003 Hoffman
6,644,617 B2 11/2003 Pitlor
6,821,126 B2 11/2004 Neidlein
6,888,940 B1 5/2005 Deppen
6,919,787 B1 7/2005 Macken
6,981,391 B2 1/2006 Suzuki
7,431,251 B2 10/2008 Carnevali
7,523,527 B2 4/2009 Garber
7,683,572 B2 3/2010 Toya
7,735,644 B2 6/2010 Sirichai et al.
7,755,666 B2 7/2010 Noji
7,762,817 B2 7/2010 Ligtenberg et al.
7,837,160 B2 11/2010 Huang
7,956,712 B2 6/2011 Fullerton et al.
8,169,185 B2 5/2012 Partovi et al.
8,238,086 B2 8/2012 Ou
8,269,595 B2 9/2012 Okada et al.
8,344,836 B2 1/2013 Lauder et al.
8,362,667 B2 1/2013 Jin et al.
8,376,292 B2 2/2013 Cicco
8,430,434 B2 4/2013 Fiedler
8,509,865 B1 8/2013 LaColla et al.
8,553,408 B2 10/2013 Supran et al.
8,567,744 B1 10/2013 Marn et al.
8,688,037 B2 4/2014 Chatterjee et al.
8,695,934 B2 4/2014 Jensen
8,706,175 B2 4/2014 Cho
8,718,731 B1 5/2014 Tang
8,727,290 B1 5/2014 De La Matta et al.
8,794,682 B2 8/2014 Fiedler
8,823,477 B2 9/2014 Malanczyj et al.
8,915,361 B2 12/2014 Rayner
8,931,745 B2 1/2015 Ng
8,936,222 B1 1/2015 Bastian et al.
9,019,698 B2 4/2015 Thiers
9,112,363 B2 8/2015 Partovi
9,197,726 B2 11/2015 Stanimirovic et al.
9,243,739 B2 1/2016 Peters
9,367,090 B2 6/2016 Barnett et al.
9,397,719 B1 7/2016 Schmidt
9,602,646 B2 3/2017 Stanimirovic et al.
9,689,527 B2 6/2017 Franklin
9,706,829 B2 7/2017 Tilney
9,743,745 B2 8/2017 Duddy
9,800,283 B2 10/2017 Schmidt
9,804,636 B2 10/2017 Barnett et al.
9,814,289 B2 11/2017 Lay et al.
9,848,071 B2 12/2017 Thiers
9,913,388 B1 3/2018 Mchatet
9,980,543 B2 5/2018 Ma et al.
10,003,372 B2 6/2018 Stanimirovic et al.
10,019,034 B2 7/2018 Barnett et al.
10,040,405 B2 8/2018 Liao
10,078,346 B2 9/2018 Lay et al.
10,192,665 B2 1/2019 Breiwa et al.
10,200,518 B2 2/2019 Richter
10,363,884 B2 7/2019 Chen
10,396,575 B2 8/2019 Stanimirovic et al.
10,404,089 B2 9/2019 Kasar et al.
10,484,522 B1 11/2019 McHatet
10,571,964 B2 2/2020 Barnett et al.
10,583,790 B2 3/2020 Wang
10,655,656 B2 5/2020 Franklin
10,673,997 B2 6/2020 Cantoli-Alves et al.
10,686,320 B2 6/2020 Stanimirovic et al.
10,703,297 B1 7/2020 Cohen et al.
10,764,417 B1 9/2020 Malach
10,836,325 B1 11/2020 Seko
10,855,092 B2 12/2020 Stanimirovic et al.
10,988,197 B1 4/2021 Hamilton et al.
11,034,309 B2 6/2021 Chow
11,044,974 B2 6/2021 Whitten et al.
11,201,481 B2 12/2021 Lu
11,201,484 B2 12/2021 Weber et al.
11,239,682 B2 2/2022 Cakmak
11,265,035 B1 3/2022 Zhang
11,277,504 B2 3/2022 Cantoli-Alves et al.
11,394,244 B2 7/2022 Parkin
11,548,451 B2 1/2023 Jankura et al.
11,552,667 B2 1/2023 Balderston
11,722,015 B2 8/2023 Walton et al.
11,750,042 B2 * 9/2023 Lai .......................... H02J 50/80
320/108
12,040,643 B2 7/2024 Karanikos et al.
2002/0003874 A1 1/2002 Peiker
2004/0079111 A1 4/2004 Hartgrove
2004/0232291 A1 11/2004 Carnevali
2005/0023841 A1 2/2005 Chen
2005/0121579 A1 6/2005 Rim et al.
2005/0283953 A1 12/2005 Jeffrey
2006/0054647 A1 3/2006 Kathrein et al.
2006/0086873 A1 4/2006 Chen
2006/0091222 A1 5/2006 Leung et al.
2006/0229740 A1 10/2006 Kreisel et al.
2006/0230296 A1 10/2006 Peterson et al.
2006/0237604 A1 10/2006 Tan
2007/0090241 A1 4/2007 Risse
2007/0099469 A1 5/2007 Sorensen
2007/0120392 A1 5/2007 Wolfinger
2007/0225031 A1 9/2007 Bodkin et al.
2007/0286410 A1 12/2007 Daly et al.
2008/0023508 A1 1/2008 Harchol
2008/0047111 A1 2/2008 Garber
2008/0110672 A1 5/2008 Ryan
2008/0156833 A1 7/2008 Espiritu et al.
2008/0271296 A1 11/2008 Jepsen
2008/0302687 A1 12/2008 Sirichai et al.
2010/0072334 A1 3/2010 Le Gette et al.
2010/0131691 A1 5/2010 Chatterjee et al.
2010/0225429 A1 9/2010 Tsai
2010/0317418 A1 12/2010 Zanetti
2011/0050164 A1 3/2011 Partovi et al.
2011/0064401 A1 3/2011 Desorbo
2011/0079619 A1 4/2011 Lewis
2011/0147424 A1 6/2011 Brown et al.
2011/0182007 A1 7/2011 Zhu et al.
2011/0192857 A1 8/2011 Rothbaum et al.
2011/0227527 A1 9/2011 Zhu et al.
2011/0255219 A1 10/2011 Ou
2011/0255226 A1 10/2011 Duncan Seil et al.
2011/0267748 A1 11/2011 Lane et al.
2011/0297566 A1 12/2011 Gallagher et al.
2011/0303578 A1 12/2011 Mizell et al.
2012/0024741 A1 2/2012 Beatty et al.
2012/0092377 A1 4/2012 Stein
2012/0104197 A1 5/2012 Jensen
2012/0112553 A1 5/2012 Stoner et al.
2012/0118770 A1 5/2012 Valls et al.
2012/0146576 A1 6/2012 Partovi
2012/0146752 A1 6/2012 Fullerton et al.

(56) References Cited

U.S. PATENT DOCUMENTS

| | | | | |
|---|---|---|---|---|
| 2012/0175474 | A1 | 7/2012 | Barnard et al. | |
| 2012/0206090 | A1 | 8/2012 | Hyun-Jun et al. | |
| 2012/0252543 | A1 | 10/2012 | Cho | |
| 2012/0329532 | A1 | 12/2012 | Ko | |
| 2013/0068915 | A1 | 3/2013 | Yang | |
| 2013/0078855 | A1 | 3/2013 | Hornick et al. | |
| 2013/0098788 | A1 | 4/2013 | Mccarville et al. | |
| 2013/0221189 | A1 | 8/2013 | Kubin | |
| 2013/0318775 | A1 | 12/2013 | Peters | |
| 2014/0028243 | A1 | 1/2014 | Rayner | |
| 2014/0049376 | A1 | 2/2014 | Ng | |
| 2014/0128132 | A1 | 5/2014 | Cox, III | |
| 2014/0187289 | A1 | 7/2014 | Cataldo et al. | |
| 2014/0355200 | A1 | 12/2014 | Thiers | |
| 2015/0022020 | A1* | 1/2015 | Borngraber .......... | H05K 9/0007 307/104 |
| 2015/0083615 | A1 | 3/2015 | Lay et al. | |
| 2015/0163938 | A1 | 6/2015 | Vroom et al. | |
| 2015/0171649 | A1 | 6/2015 | Kim et al. | |
| 2015/0201723 | A1 | 7/2015 | Rayner et al. | |
| 2015/0380139 | A1 | 12/2015 | Hsu | |
| 2016/0040825 | A1 | 2/2016 | Franklin | |
| 2016/0058145 | A1 | 3/2016 | Whitten | |
| 2016/0115978 | A1 | 4/2016 | Buchanan | |
| 2016/0128210 | A1 | 5/2016 | Lee | |
| 2016/0150861 | A1 | 6/2016 | Yao | |
| 2016/0259374 | A1 | 9/2016 | Breiwa et al. | |
| 2016/0282907 | A1 | 9/2016 | Barnett et al. | |
| 2016/0347257 | A1 | 12/2016 | Buchanan | |
| 2016/0373152 | A1 | 12/2016 | Schmidt | |
| 2017/0155418 | A1 | 6/2017 | Kim | |
| 2018/0173275 | A1 | 6/2018 | Barnett et al. | |
| 2018/0184773 | A1 | 7/2018 | Whitten | |
| 2019/0009850 | A1 | 1/2019 | Peters | |
| 2019/0111855 | A1 | 4/2019 | Aloe et al. | |
| 2019/0198212 | A1* | 6/2019 | Levy .................. | F16M 11/2021 |
| 2019/0243421 | A1 | 8/2019 | Barnett et al. | |
| 2020/0150721 | A1 | 5/2020 | Barnett et al. | |
| 2020/0176928 | A1 | 6/2020 | Sutherland et al. | |
| 2020/0345115 | A1 | 11/2020 | Cantoli-Alves et al. | |
| 2020/0358314 | A1* | 11/2020 | Boovaragavan ........ | H02J 50/90 |
| 2020/0400267 | A1 | 12/2020 | Garza | |
| 2021/0041057 | A1 | 2/2021 | Jankura et al. | |
| 2021/0046885 | A1* | 2/2021 | Jankura ..................... | F16B 2/04 |
| 2021/0083491 | A1 | 3/2021 | Stanimirovic et al. | |
| 2021/0099027 | A1 | 4/2021 | Larsson et al. | |
| 2021/0099028 | A1 | 4/2021 | Thompson et al. | |
| 2021/0109569 | A1 | 4/2021 | Barnett et al. | |
| 2021/0124395 | A1 | 4/2021 | Barnett et al. | |
| 2021/0242697 | A1 | 8/2021 | Stanimirovic et al. | |
| 2021/0249880 | A1 | 8/2021 | Taylor et al. | |
| 2021/0408826 | A1 | 12/2021 | Liu et al. | |
| 2022/0045398 | A1 | 2/2022 | Havskjold et al. | |
| 2022/0045527 | A1 | 2/2022 | Karanikos et al. | |
| 2022/0094382 | A1 | 3/2022 | Cole et al. | |
| 2022/0096923 | A1 | 3/2022 | O'Leary et al. | |
| 2022/0103667 | A1 | 3/2022 | Chiang et al. | |
| 2022/0117098 | A1 | 4/2022 | Kalyanasundaram et al. | |
| 2022/0137491 | A1 | 5/2022 | Stankie et al. | |
| 2022/0158678 | A1 | 5/2022 | Sirichai et al. | |
| 2022/0166868 | A1 | 5/2022 | Whitten et al. | |
| 2022/0206532 | A1 | 6/2022 | Barnett et al. | |
| 2022/0311274 | A1 | 9/2022 | George | |
| 2022/0311286 | A1 | 9/2022 | Schwartz | |
| 2023/0198301 | A1* | 6/2023 | Peters ................... | A45C 11/00 320/108 |

FOREIGN PATENT DOCUMENTS

| | | | |
|---|---|---|---|
| CN | 203313551 | U | 11/2013 |
| DE | 3445832 | A1 | 6/1986 |
| DE | 9301423 | U1 | 7/1993 |
| DE | 29717382 | U1 | 2/1998 |
| DE | 102009039557 | | 3/2011 |
| DE | 102010006286 | | 8/2011 |
| DE | 102013213760 | | 1/2015 |
| DE | 102008013214 | B | 2/2025 |
| EP | 0496216 | | 3/1996 |
| EP | 1950094 | B | 9/2012 |
| EP | 2696510 | | 2/2014 |
| EP | 2869473 | A | 5/2015 |
| EP | 2529281 | B | 7/2015 |
| FR | 2840751 | A1 | 12/2003 |
| GB | 2241132 | A | 8/1991 |
| GB | 2421017 | A | 6/2006 |
| JP | S5516688 | U | 2/1980 |
| JP | S06-21350 | | 1/1987 |
| JP | H07-288570 | | 10/1995 |
| JP | 2004158796 | | 6/2004 |
| JP | 2006234896 | | 9/2006 |
| JP | 2007334258 | | 12/2007 |
| JP | 2011097770 | A | 5/2011 |
| KR | 19990036204 | U | 9/1999 |
| KR | 100381405 | B | 4/2003 |
| KR | 100402916 | B | 10/2003 |
| KR | 200396216 | Y | 9/2005 |
| KR | 20090007014 | U | 7/2009 |
| KR | 20100129880 | A | 12/2010 |
| KR | 101062570 | | 9/2011 |
| KR | 101072949 | B | 10/2011 |
| KR | 101116159 | B | 3/2012 |
| KR | 101162552 | B | 7/2012 |
| WO | 1999049584 | | 9/1999 |
| WO | WO 2000/002362 | | 1/2000 |
| WO | WO 2005/056340 | | 6/2005 |
| WO | WO 2011/141031 | | 11/2011 |
| WO | 2012016158 | | 2/2012 |
| WO | 2014107157 | | 7/2014 |

OTHER PUBLICATIONS

Ghostek, "Detachable Wallet—iPhone 13," accessed on the Internet at: https://ghostek.com/collections/exec/products/exec-iphone-13-wallet-case (believed to be publicly available before Jun. 28, 2022).

Ghostek, "Detachable Wallet—Pixel 7," accessed on the Internet at: https://ghostek.com/collections/exec/products/exec-pixel7 (believed to be publicly available before Jun. 28, 2022.

Rokform, "Rugged Case—iPhone 13 Pro Max—Magnetic Mounting," accessed on the Internet at: https://www.rokform.com/products/rugged-case-iphone-13-pro-max (publicly available at least by Dec. 10, 2021).

Rokform, "Rugged Case—iPhone 13 Pro Max—MagSafe® Compatible," accessed on the Internet at: https://www.rokform.com/products/rugged-case-iphone-13-pro-max (publicly available at least by Dec. 10, 2021).

Wallee M, "Modular Magnetic Phone Mounting System by StudioProper—Kickstarter," access on the Internet at: https://web.archive.org/web/20131117085948/http://www.kickstarter.com (Nov. 17, 2013).

Search Regort & Written Oginion issued in PCT/IB2022/062249 (Jan. 30, 2023).

Search Report & Written Opinion issued in PCT/IB2022/062252 (Jan. 31, 2023).

"Accessory Design Guidelines for Apple Devices" 2020, Apple, Inc., pp. 1-284, https://web.archive.org/web/20201027114221/https:/developer.apple.com/accessories/Accessory-Design-Guidelines.pdf.

Brownlee, Marques, "iPhone 12 Unboxing Experience + MagSafe Demo!", Youtube, Oct. 20, 2020, https://www.youtube.com/watch?v=Sx6dAx7dnXg.

MobileReviewsEh, "I Took Apart My $60 MagSafe Case. What Did I Find?" Youtube, Oct. 21, 2020, https://www.youtube.com/watch?v=Hj6Gen7L4yA.

Apple, Apple Event—Oct. 13, Youtube, Oct. 13, 2020, https://www.youtube.com/watch?v=KR0g-1hnQPA.

* cited by examiner

WIRELESS CHARGER ASSEMBLY FOR A CELLPHONE

CROSS REFERENCE TO RELATED APPLICATION

This application claims the benefit of priority under 35 U.S.C. § 119(e) to U.S. Provisional Patent Application No. 63/290,799, filed Dec. 17, 2021. The disclosure set forth in the referenced application is incorporated herein by reference in its entirety.

BACKGROUND

The present invention relates generally to a wireless charger assembly for charging a cellphone.

It is generally known to use wireless charging to charge smart phones and other cellphones. When the cellphone is disposed within a protective cellphone case, however, the wireless charging becomes slower and less efficient because the thickness of the cellphone case causes increased separation between the transmitting coil of the wireless charger mount and the receiving coil of the cellphone.

SUMMARY

The present disclosure relates to a wireless charger assembly for wirelessly charging a cellphone having a receiving coil. The wireless charger assembly includes a cellphone case securable to the cellphone. The bottom of the cellphone case defines a bore. The bottom has a thickness surrounding the bore. The wireless charger assembly also includes a wireless charger mount securable to the cellphone case. The wireless charger mount includes a base, a protrusion, and a transmitting coil housed within the protrusion. The protrusion and the transmitting coil are receivable within the bore for charging the cellphone when the cellphone case is secured to the cellphone and the wireless charger mount. The thickness of the bottom surrounding the bore is greater than the distance between the transmitting coil and the receiving coil when the cellphone case is secured to the cellphone and the wireless charger mount.

The wireless charger assembly may comprise a plurality of metal plates for magnetically securing the wireless charger mount to the cellphone case. The cellphone case may include one of those metal plates and the protrusion of the wireless charger mount includes another one of those metal plates. One of the metal plates is a magnet and the other metal plate may be a a magnet or a metal plate including a metal magnetically attracted to the magnet. Instead of the metal plates, or in addition to the metal plates, the wireless charger mount may include at least one tab and the bottom of the cellphone case may define at least one slot contiguous with the bore for receiving the tab. The wireless charger mount may be rotatable relative to the cellphone case to engage the tab and the cellphone case when the tab is received by the slot. In one embodiment, there are four slots spaced 90 degrees apart and four tabs spaced 90 degrees apart.

These and other features of the present invention will be best understood from the following drawings and detailed description.

BRIEF DESCRIPTION OF THE DRAWINGS

The various features and advantages of the invention will become apparent to those skilled in the art from the following detailed description of the illustrated embodiments. The drawings that accompany the detailed description can be briefly described as follows.

Figure 1:
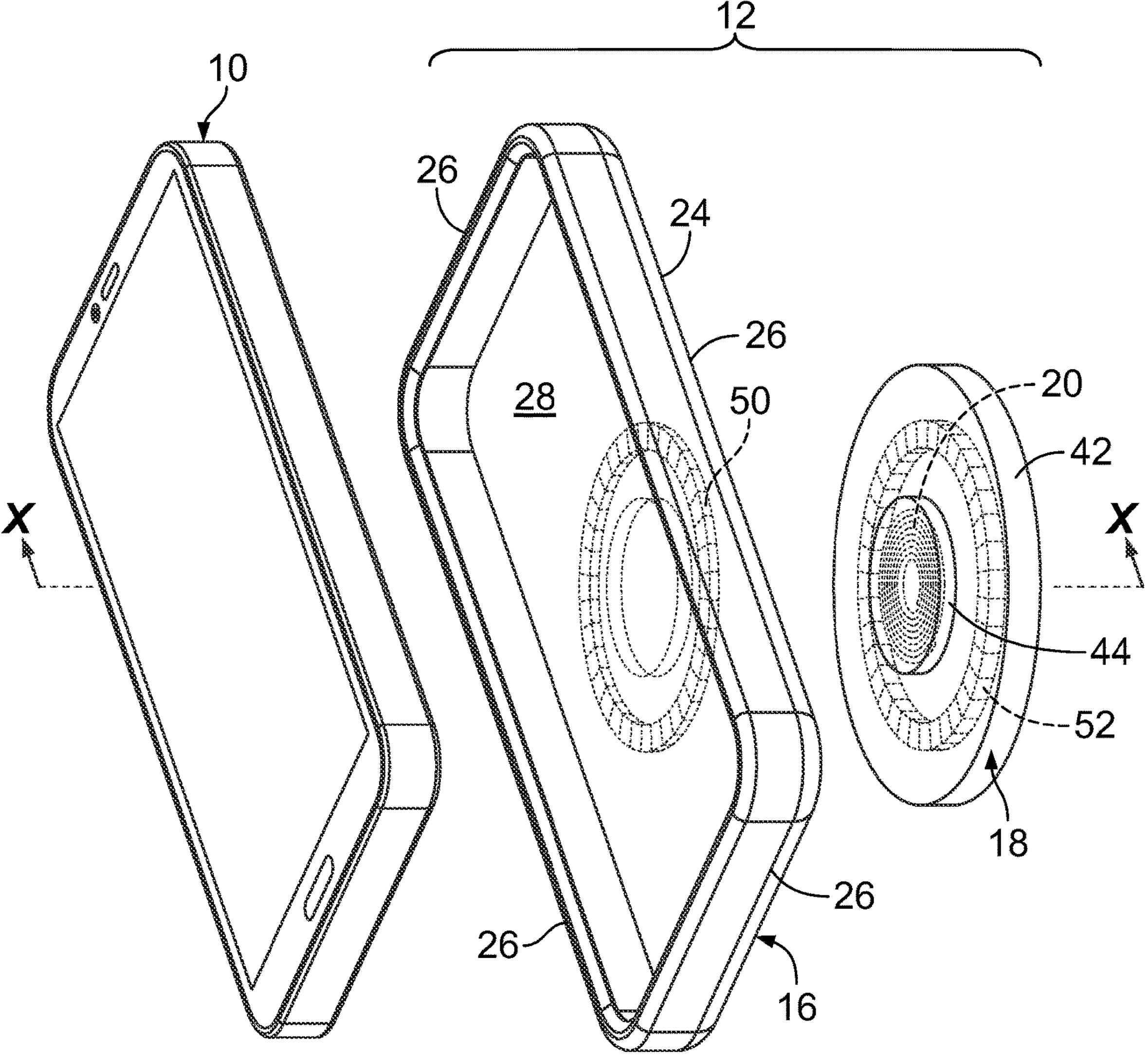
FIG. 1 is an exploded view of a cellphone and a wireless charger assembly for charging the cellphone in accordance with an embodiment of the present disclosure, illustrating in dashed lines one of the metal plates for magnetically securing together the assembly and the transmitting coil.
Figure 2:
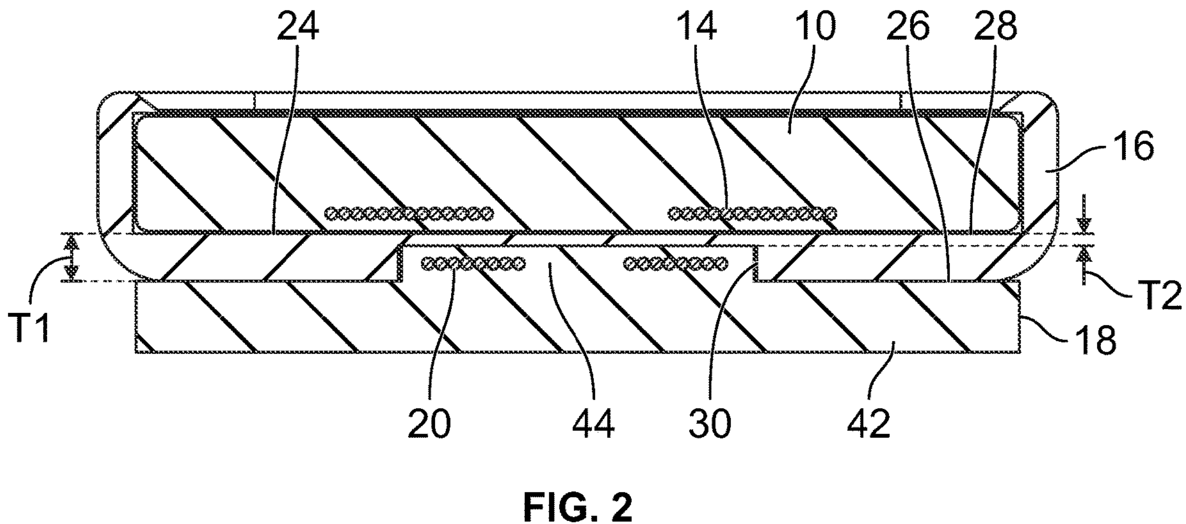
FIG. 2 is a sectional view taken along the lines X-X of FIG. 1 when the cellphone and the wireless charger mount are secured together in accordance with an embodiment that does not include metal plates.
Figure 3:
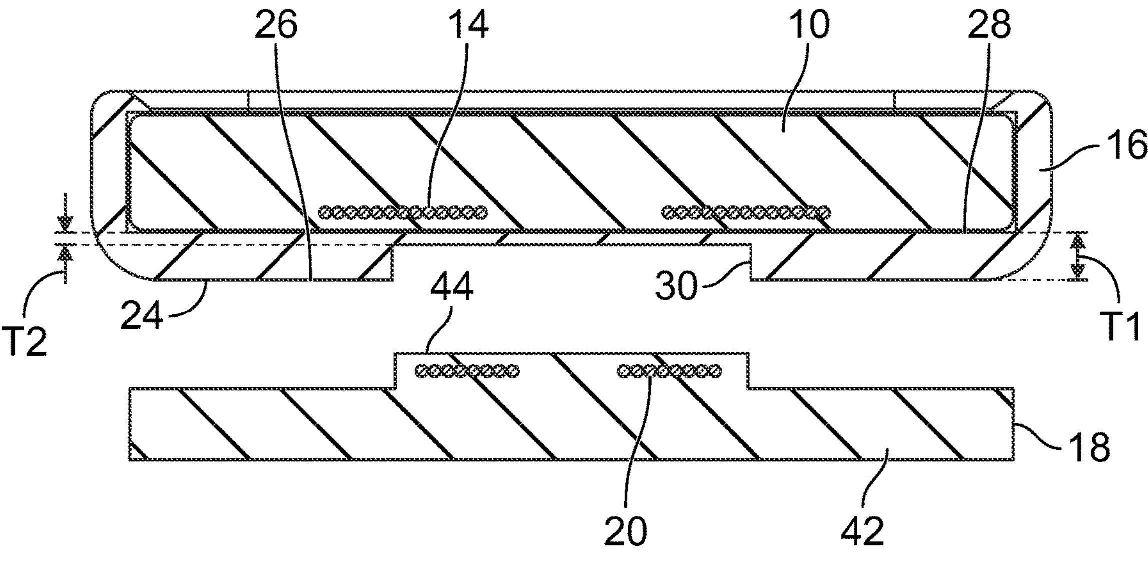
FIG. 3 is a sectional view taken along the lines X-X of FIG. 1 when the cellphone is mounted to the cellphone case of the wireless charger mount prior to the securement of the wireless charger mount of the wireless charger assembly to the cellphone case in accordance with an embodiment that does not include metal plates.

Other aspects and advantages of the present disclosure will become apparent upon consideration of the following detailed description.

DETAILED DESCRIPTION

FIGS. 1-4 illustrate an embodiment of a cellphone 10 and a wireless charger assembly 12 for charging the cellphone in accordance with an embodiment of the present disclosure. The cellphone 10 may be an iPhone or any other type of handheld phone. The cellphone 10 has a receiving coil 14. The illustrated wireless charger assembly 12 includes a protective cellphone case 16 and a wireless charger mount 18 having a transmitting coil 20 for charging the cellphone 10 when the wireless charger assembly 12 and the cellphone 10 are secured to the cellphone case 16.

The illustrated cellphone case 16 has a bottom 24 and a plurality of side rails 32 for engaging the cellphone 10 and securing the cellphone case to the cellphone. The bottom 24 has a bottom side 26 and a top side 28. The bottom side 26 defines a bore 30. The bottom 24 has a thickness T1 surrounding the bore 30 that is greater than the thickness T2 of the portion at the bore. The bore 30 may be circular or have any other configuration.

The illustrated wireless charger mount 18 includes a base 42 and a protrusion 44 extending from the base. The base 42 and protrusion 44 are disk shaped with the diameter of the protrusion being less than the diameter of the base. The wireless charger mount 18 may have any other shape and construction in accordance with other embodiments of the present disclosure. The transmitting coil 20 is disposed or otherwise housed in the protrusion 44. The protrusion 44 is receivable in the bore 30 defined by the bottom 24. The wireless charger mount 18 includes any suitable power source (not shown) including any suitable cable connected to the wireless charger mount 18 in any suitable manner for providing power to the transmitting coil 20. The cellphone case 16 and the casing of the wireless charger mount 18 may be constructed of any suitable plastic or any other suitable material and may have any other suitable configuration in accordance with other embodiments of the present disclosure.

Figure 4:
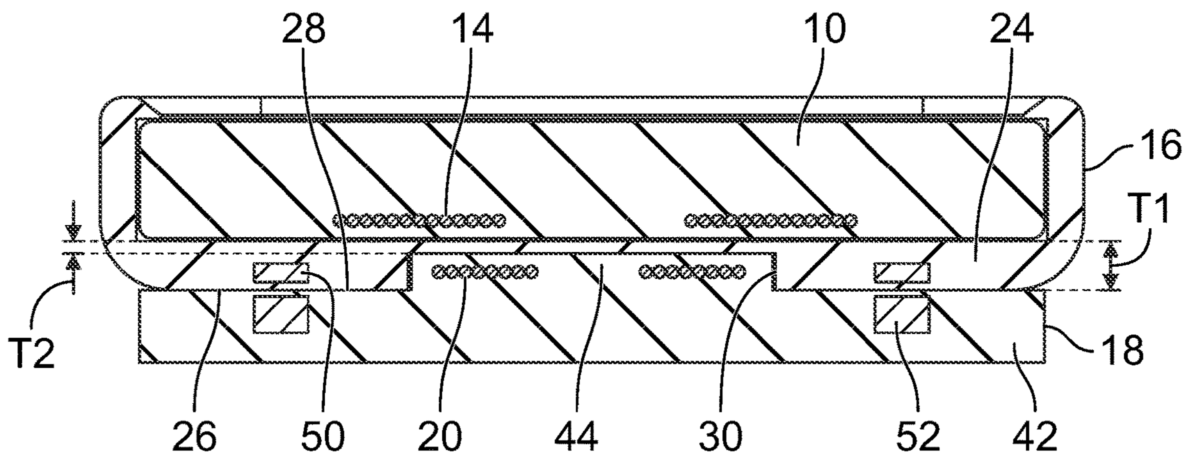
FIG. 4 is a sectional view taken along the lines X-X of an embodiment of FIG. 1 illustrating metal plates in the cellphone case and wireless charger mount for securing the wireless charger mount to the cellphone case.

The cellphone case 16 and the wireless charger mount 18 may be engaged or otherwise secured together. In FIGS. 1 and 4, for example, the cellphone case 16 includes a metal plate 50 and the base 42 of the wireless charger mount 18 includes a metal plate 52. These two metal plates 50 and 52 are positioned to magnetically couple as the base 42 is received by the bore 30. The metal plates 50 and 52 may be in the form of a pair of magnets. Alternatively, one of the two metal plates 50 and 52 can be in the form of a magnet and the other of the two metal plates may be in in the form of an other metal plate that is attracted to the magnet. The metal plates 50 and 52 may, for example, be in the form of circular magnetic arrays that are compatible with Apple's MAGSAFE technology, which Apple Computer, Inc. ("Apple") has developed magnetic technology for magnetically securing or otherwise mounting iPhone products to accessory products. The metal plates 50 and 52 may have any suitable configurations in accordance with other embodiments of the present disclosure.

The cellphone case 16 and the wireless charger 18 may be secured together in any other suitable manner. For example, instead of the metal plates 50 and 52, or in addition to the metal plates 50 and 52, the cellphone case 16 may define one or more slots contiguous with the bore 30, and the protrusion 44 of the wireless charger mount 18 may include one or more tabs receivable by the one or more slots. When the one or more tabs are received by and pass through the one or more slots, the cellphone case 16 may be secured to the wireless charger mount 18 by rotating the wireless charger mount relative to the cellphone case.

Figure 5:
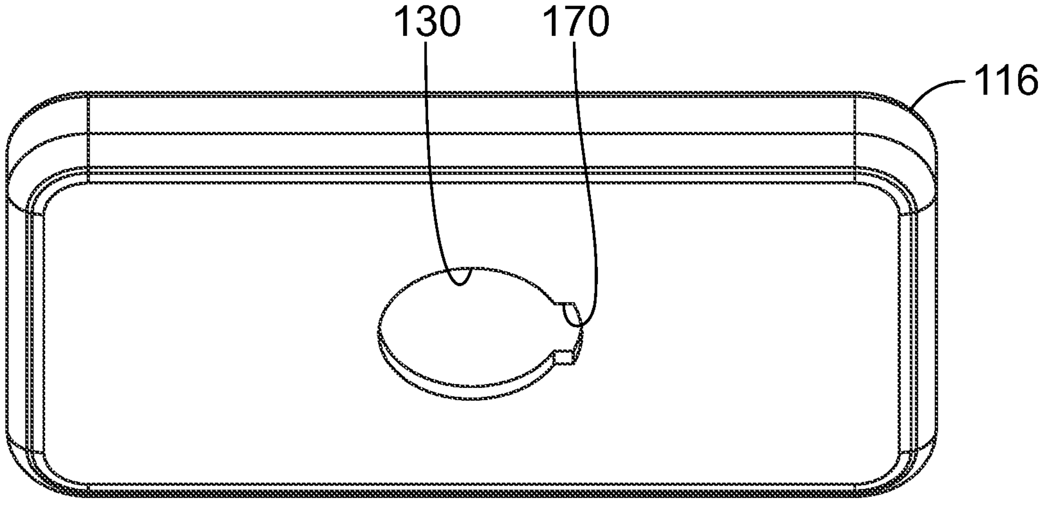
FIG. 5 is an exploded view of a wireless charger mount in accordance with another embodiment of the present disclosure.
Figure 5:
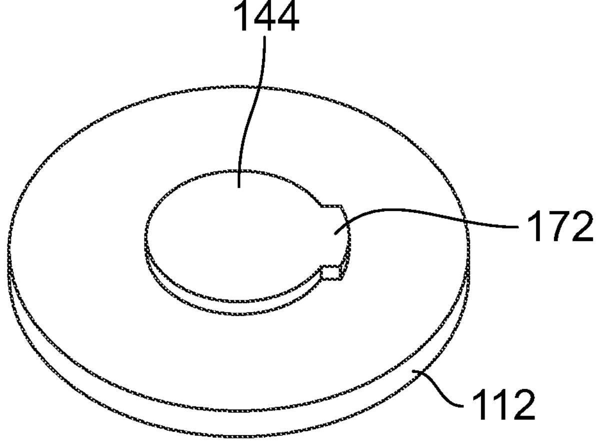
Figure 6:
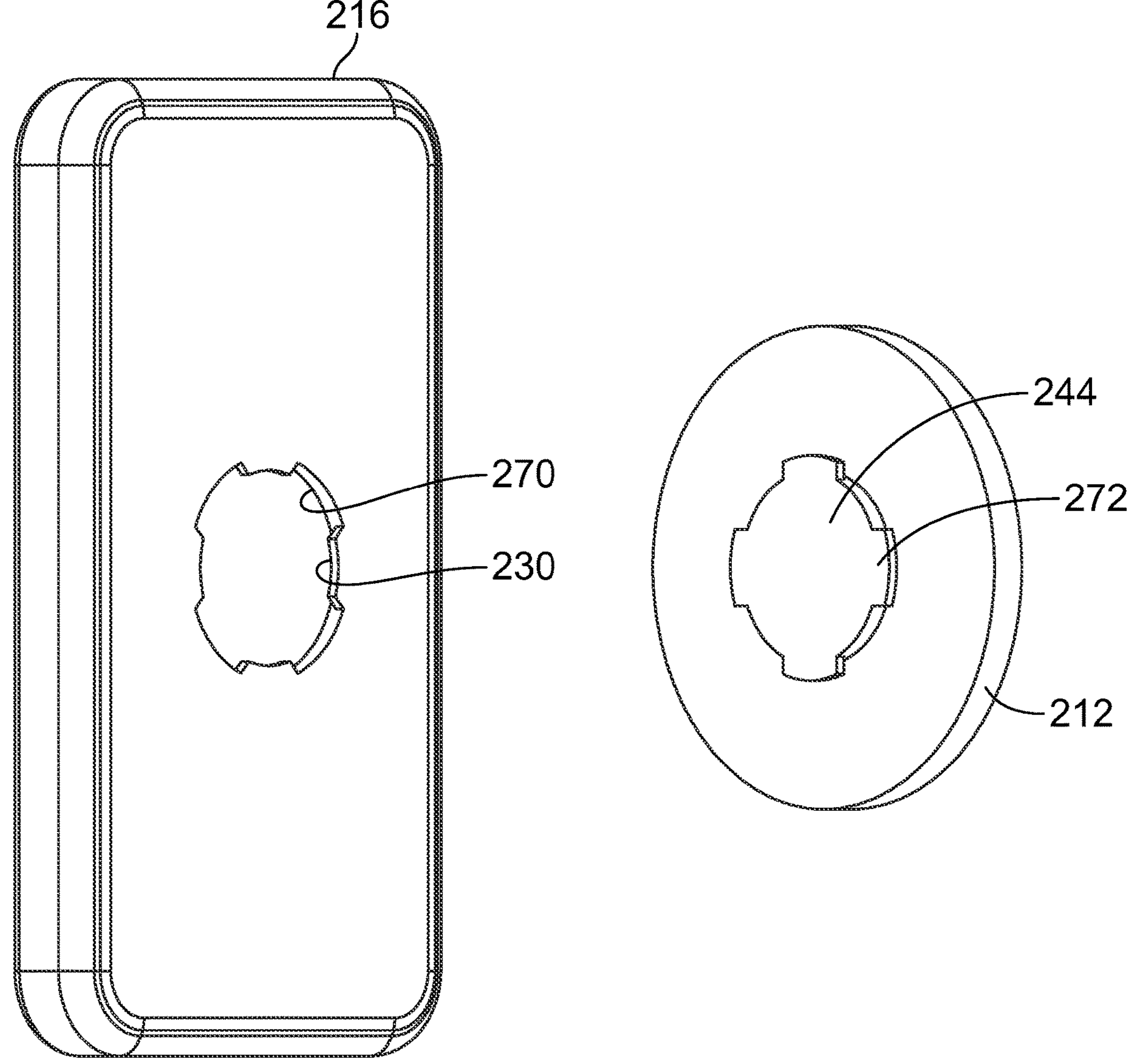
FIG. 6 is an exploded view of a wireless charger mount in accordance with another embodiment of the present disclosure.
Figure 7:
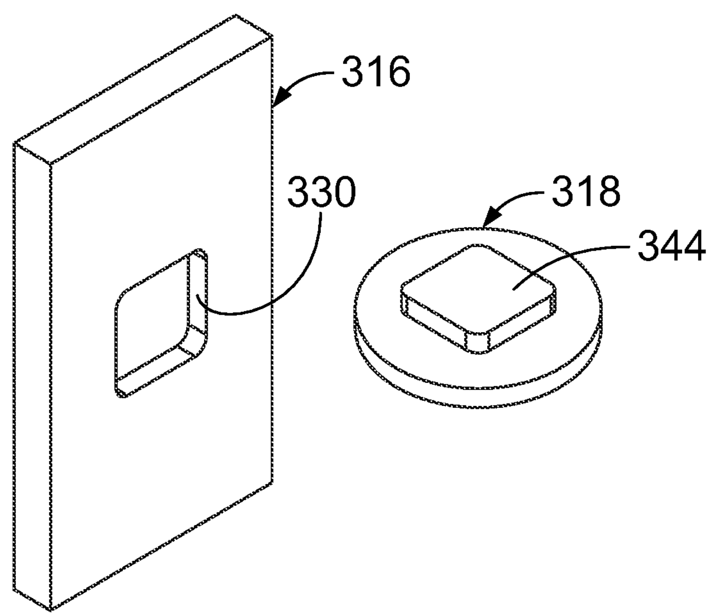
FIG. 7 is a cut out view of the cellphone case and a perspective of the wireless charger mount of a wireless charger assembly in accordance with another embodiment of the present disclosure.

In the embodiment of FIG. 5, for example, the cellphone case 116 has one lateral slot 150 extending from the bore 130 and the protrusion 144 of the wireless charger mount 118 has one lateral tab 152 extending from the base parallel to the axis of the wireless charger mount. The wireless charger mount 118 is secured to the cellphone case by receiving into the lateral slot 150 the lateral tab 152. With this embodiment, the wireless charger mount 118 does not rotate relative to the cellphone case 116 when the lateral tab 152 is received by the lateral slot 150. In the embodiment of FIG. 6, the cellphone case 216 includes four slots 250 extending laterally from the bore 230 spaced 90 degrees apart, and the protrusions 244 of the wireless charger mount 218 has four lateral tabs 252 spaced 90 degrees apart. The wireless charger mount 218 is secured to the cellphone case 216 by receiving into the lateral slots 250 the lateral tabs 152 and rotating the wireless charger mount 118 relative to the cellphone case 116 45 degrees such that the lateral tabs engage the opposite side of the cellphone case. The embodiment of FIG. 6 also can be characterized as having two slots 250 extending laterally from the bore 230 and spaced 180 degrees apart, and the protrusions 244 of the wireless charger mount 218 as having two lateral tabs 252 spaced 180 degrees apart. The bore, the protrusion and, if included, the slots may have any suitable size or configuration in accordance with other embodiments of the present disclosure. Metal plates may be included with the embodiments of FIGS. 5 and 6 or may be omitted. In the embodiment of FIG. 7, the bore 330 of the cellphone case 316 is square and the protrusion 344 of the wireless charger mount 318 is square. The square configurations of the bore 330 of the cellphone case 316 and the protrusion 344 of the wireless charger mount 318 prevents rotation of the respective wireless charger 318 relative to the cellphone case 316. In each of the embodiments of FIGS. 5-7, a transmitting coil is housed within the respective protrusion 144, 244 and 344 which is received within a respective bore 130, 230 and 330 and thus is positioned closer to a receiving coil of a cellphone secured to the cellphone case.

Figure 8:
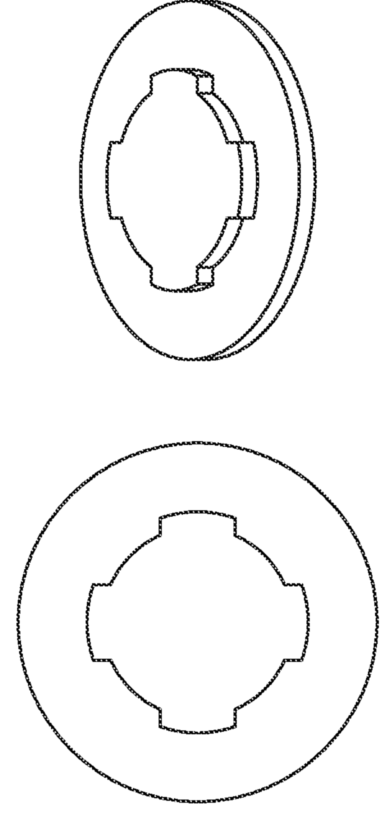
FIG. 8 is a cut out view of the cellphone case and a perspective of the wireless charger mount of a wireless charger assembly in accordance with another embodiment of the present disclosure.

In the embodiment of FIG. 8, four lateral tabs 452 extend from the base parallel to the axis of the wireless charger mount 418 and are received by four lateral slots of the the cellphone case 416. With this embodiment the wireless charger mount 418 cannot rotate relative to the cellphone case 416. A transmitting coil is housed within the protrusion 444 which is received within the bore 416 and thus is positioned closer to a receiving coil of a cellphone secured to the cellphone case. The cellphone case can have more or less than four slots and the protrusion of the cellphone case can have more or less than four lateral tabs in accordance with other embodiments of the present disclosure.

The present disclosure provides more efficient wireless charging for protective cellphone cases. Because of their thickness, cellphone cases generally interfere or limit wireless charging through the cellphone case. With the present disclosure, however, the distance between the receiving coil 14 and the transmitting coil 20 is less than the thickness T1 of the bottom 24 surrounding the bore 30 of the cellphone case 16 because the protrusion 44 and transmitting coil are received by the bore and because the thickness T2 of the bottom at the location of the bore is less than the thickness T1 of the bottom surrounding the bore. As a result of this construction, the receiving and transmitting coils 14 and 20 are nearer to each other, which increases wireless charging speed and efficiency, and the cellphone case 16. At the same time, the disclosed embodiments of the present disclosure enables alignment of the transmitting and receiving coils in the other two directions. Still further, the cellphone case 16 protects the cellphone 10 because of the thickness of the portion of the cellphone case surrounding the bore 30.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A wireless charger assembly for wirelessly charging a cellphone having a receiving coil comprising:

a cellphone case securable to the cellphone, the cellphone case comprising a first locking member and a bottom defining a bore, the bottom having a thickness surrounding the bore; and a wireless charger mount securable to the cellphone case, the wireless charger mount comprising a second locking member, a base, a protrusion, and a transmitting coil housed within the protrusion, the protrusion and the transmitting coil receivable within the bore for charging the cellphone when the cellphone case is secured to the cellphone and the wireless charger mount;

wherein the thickness of the bottom surrounding the bore is greater than the distance between the transmitting coil and the receiving coil when the cellphone case is secured to the cellphone and the wireless charger mount, and wherein the cellphone case is releasably secured to the wireless charger mount by rotating at least one of the first locking member and the second locking member.

2. The wireless charger assembly of claim 1, further comprising a plurality of metal plates for magnetically securing the wireless charger mount to the cellphone case.

3. The wireless charger assembly of claim 1, wherein the cellphone case includes a first metal plate and the base includes a second metal plate, at least one of the first and second metal plates being a magnet, the first and second metal plates for magnetically securing the wireless charger mount to the cellphone case.

4. The wireless charger assembly of claim 1, wherein the second locking member comprises a plurality of tabs and the first locking member comprises a plurality of slots contiguous with the bore for receiving the tabs, the wireless charger mount being rotatable relative to the cellphone case to engage the tabs and the cellphone case when the tabs are received by the slots.

5. The wireless charger assembly of claim 4, further comprising a plurality of metal plates for magnetically securing the wireless charger mount to the cellphone case.

6. The wireless charger assembly of claim 4, wherein the cellphone case includes a first metal plate and the base includes a second metal plate, and wherein the first and second metal plates magnetically secure the wireless charger mount to the cellphone case.

7. The wireless charger assembly of claim 1, wherein the second locking member comprises four lateral tabs spaced 90 degrees apart and the first locking member comprises four lateral slots contiguous with the bore spaced 90 degrees apart for receiving the tabs, the wireless charger mount being rotatable relative to the cellphone case to engage the tabs and the cellphone case when the tabs are received by the slots.

8. The wireless charger assembly of claim 7, wherein the cellphone case includes a first metal plate and the base includes a second metal plate, and wherein the first and second metal plates magnetically secure the wireless charger mount to the cellphone case.

9. The wireless charger assembly of claim 1, wherein the second locking member comprises two lateral tabs spaced 180 degrees apart and the first locking member comprises two lateral slots contiguous with the bore spaced 180 degrees apart for receiving the tabs, the wireless charger mount being rotatable relative to the cellphone case to engage the tabs and the cellphone case when the tabs are received by the slots.

10. The wireless charger assembly of claim 1, wherein the base is circular and the protrusion is disk shaped and has a diameter and the base is disk shaped and has a diameter, the diameter of the base being greater than the diameter of the protrusion.

11. The wireless charger assembly of claim 1, wherein the cellphone case is releasable from the wireless charger mount by rotating at least one of the first locking member and the second locking member.

12. A wireless charger assembly for wirelessly charging a cellphone having a receiving coil comprising:

a cellphone case securable to the cellphone having a bottom defining a bore, the bottom having a thickness surrounding the bore; and a wireless charger mount securable to the cellphone case, the wireless charger mount including a base, a protrusion, and a transmitting coil housed within the protrusion, the protrusion and the transmitting coil receivable within the bore for charging the cellphone when the cellphone case is secured to the cellphone and the wireless charger mount;

wherein the thickness of the bottom surrounding the bore is greater than the distance between the transmitting coil and the receiving coil when the cellphone case is secured to the cellphone and the wireless charger mount, and wherein the wireless charger mount includes at least one tab and the bottom defines at least one slot contiguous with the bore for receiving the tab, the wireless charger mount being rotatable relative to the cellphone case to engage the tab and the cellphone case when the tab is received by the slot.

13. The wireless charger assembly of claim 12, further comprising a plurality of metal plates for magnetically securing the wireless charger mount to the cellphone case.

14. The wireless charger assembly of claim 12, wherein the cellphone case includes a first metal plate and the base includes a second metal plate, at least one of the first metal plate and second metal plates being a magnet, the first and second metal plates for magnetically securing the wireless charger mount to the cellphone case.

15. A wireless charger assembly for wirelessly charging a cellphone having a receiving coil comprising:

a cellphone case securable to the cellphone having a bottom defining a bore, the bottom having a thickness surrounding the bore, the bore including at least one lateral slot;

a wireless charger mount securable to the cellphone case, the wireless charger mount including a base, a protrusion, and a transmitting coil housed within the protrusion, the protrusion and the transmitting coil receivable within the bore for charging the cellphone when the cellphone case is secured to the cellphone and the wireless charger mount, the protrusion including at least one lateral tab;

the wireless charger mount being securable to the cellphone case by rotating the wireless charger mount relative to the cellphone case when the lateral tab of the protrusion is received by the lateral slot of the cellphone case; and wherein the thickness of the bottom surrounding the bore is greater than the distance between the transmitting coil and the receiving coil when the cellphone case is secured to the cellphone and the wireless charger mount.

16. The wireless charger assembly of claim 15, wherein the protrusion is disk shaped and has a diameter and the base is disk shaped and has a diameter, the diameter of the base being greater than the diameter of the protrusion.

17. A wireless charger assembly for wirelessly charging a cellphone having a receiving coil comprising:

a cellphone case securable to the cellphone having a bottom defining a bore, the bottom having a thickness surrounding the bore, the bore including four lateral slots spaced 90 degrees apart;

a wireless charger mount securable to the cellphone case, the wireless charger mount including a base, a protrusion, and a transmitting coil housed within the protrusion, the protrusion and the transmitting coil receivable within the bore for charging the cellphone when the cellphone case is secured to the cellphone, the protrusion including four lateral tabs spaced 90 degrees apart;

the wireless charger mount being securable to the cellphone case by rotating the wireless charger mount relative to the cellphone case when the lateral tabs of the protrusion are received by the lateral slots of the cellphone case;

wherein the thickness of the bottom surrounding the bore is greater than the distance between the transmitting coil and the receiving coil when the cellphone case is secured to the cellphone.

18. The wireless charger assembly of claim 17, wherein the base is circular and the protrusion is disk shaped and has a diameter and the base is disk shaped and has a diameter, the diameter of the base being greater than the diameter of the protrusion.

* * * * *